Mar. 3, 1925.

G. A. YOUNG 1,528,232

OVEN

Filed Aug. 22, 1921

Inventor
George A. Young.
By
Attorneys

Mar. 3, 1925.  
G. A. YOUNG  
OVEN  
Filed Aug. 22, 1921  
1,528,232  
2 Sheets-Sheet 2

Inventor  
George A. Young.  
By  
Attorneys

Patented Mar. 3, 1925.

1,528,232

UNITED STATES PATENT OFFICE.

GEORGE A. YOUNG, OF DETROIT, MICHIGAN.

OVEN.

Application filed August 22, 1921. Serial No. 494,117.

*To all whom it may concern:*

Be it known that I, GEORGE A. YOUNG, a citizen of the United States of America, residing at Detroit, in the county of Wayne and State of Michigan, have invented certain new and useful Improvements in Ovens, of which the following is a specification, reference being had therein to the accompanying drawings.

This invention relates to ovens and a method of recirculating air within an oven, and my invention aims to provide a forced draft apparatus by which air within an oven may be maintained in circulation; air admitted to the oven, or fumes and gases exhausted from the oven. In the first instance, the circulation of air permits of a uniform temperature being maintained throughout the oven for drying, curing, baking or other purposes. Second, by admitting air to an oven the temperature of the air therein may be lowered or otherwise regulated, and third, by providing the exhaust for fumes and gases, it will be possible to quickly drive the fumes and gases from the oven in order that the same may be safely entered or used.

My invention further aims to arrange ducts or conduits in an oven so that air may be taken from the lower part of the oven and the upper part thereof and returned to the lower part of the oven in proximity to a heating apparatus, which may be electrically operated heating units, a steam heating system, a gas heating system, fire chambers or any safe and easily controlled heating apparatus which can be installed in an oven. The arrangement of the ducts or conduits is such as not to materially interfere with the capacity of the oven or loading and unloading of the same.

My invention still further aims to provide an oven, kiln, or air heated chamber that may be advantageously used in the automobile industry for the treatment of automobile parts, particularly the drying of painted or otherwise finished parts and the drying or baking of cores used in molding metallic parts of an automobile. The construction entering into the oven and the method of recirculating air will be hereinafter described and then claimed, and reference will now be had to the drawings, wherein Figure 1 is a plan of the oven;

Figure 1:
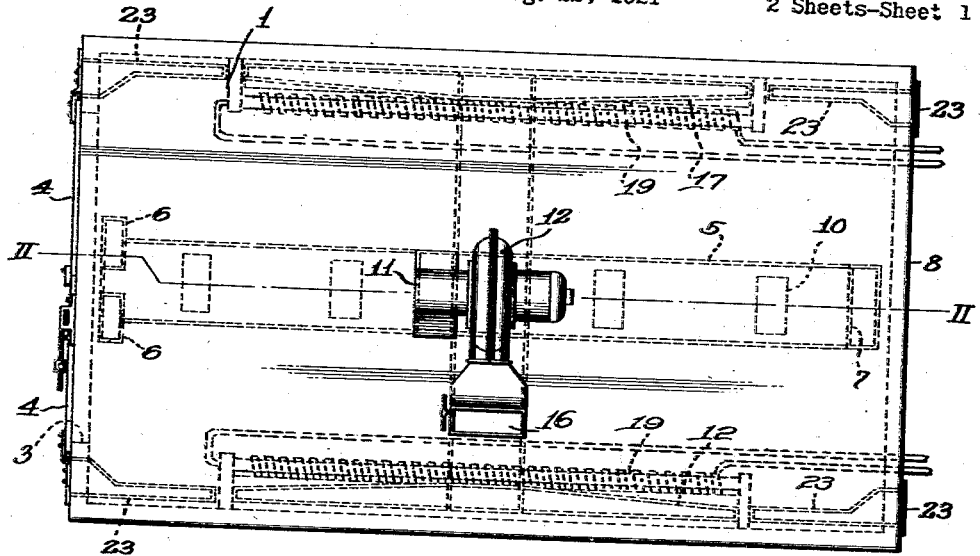

In the drawings the reference numeral 1 denotes an oven, chamber, or compartment of a building and an end wall 2 of the oven is provided with a large doorway 3 adapted to be closed by doors 4.

Extending longitudinally of the oven, below the top or roof thereof is a duct or flue 5 having depending ends 6 and 7, the former being adjacent the doorway 3 and the latter adjacent the rear wall 8 of the oven. The depending ends 6 and 7 of the flue 5 are open adjacent the bottom or floor 9 of the oven and in directions away from the walls 2 and 8, so that the ends of the flue may receive air from above the bottom or floor 9 of the oven.

The flue 5, along the top or ceiling of the oven has a plurality of air inlet openings 10 to receive air from the upper portion of the oven, and said flue has an upright portion 11 extending through the top wall or roof of the oven and connected to a conventional form of motor driven exhaust fans 12 suitably mounted on the top wall or roof of the oven.

Extending transversely of the oven, adjacent the flue 5, is a duct or conduit 13 having an upright portion 14 extending through the top wall or roof of the oven and connected to the fan 12 by a two-way connection 15, said two-way connection opening to the atmosphere and having a damper 16 which may be regulated to cause the fan to exhaust into the conduit 13 or to the atmosphere, or admit cold air to the conduit 13 to regulate the temperature within the oven. Any suitable means may be employed for conveniently adjusting the damper 16.

Figure 3:
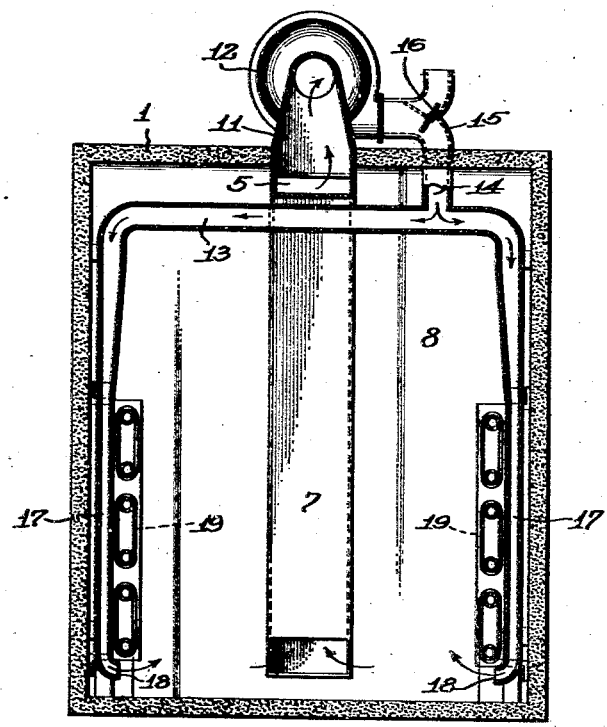
Fig. 3 is a cross sectional view of the oven taken on the line III—III of Fig. 2.
Figure 4:
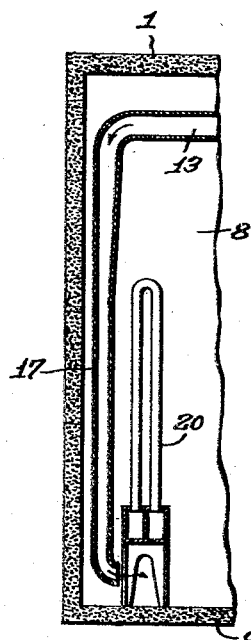
Fig. 4 is a vertical cross sectional view of a portion of an oven, illustrating a steam heating apparatus for the oven.
Figure 5:
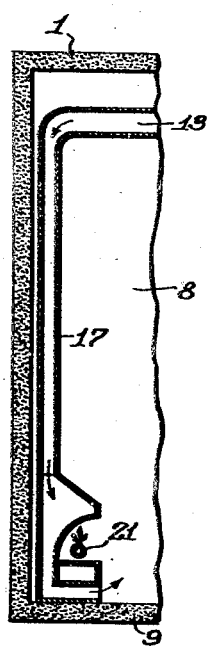
Fig. 5 is a similar view showing a gas burning apparatus for heating the oven.

The conduit 13 extends towards the side walls of the oven and each end of the conduit has depending flared or enlarged branches 17 disposed in parallelism at the side walls of the oven and extending in proximity to the bottom or floor 9 of the oven, the lower ends of the conduit branches 17 being open and turned inwardly, so as to direct incoming air centrally of the oven and particularly adjacent an electric heating apparatus 19 in proximity to each side wall of the oven. Each apparatus is of a conventional form and has been illustrated in Figs. 1, 2 and 3. Instead of using an electrically operated heating apparatus, I may provide a steam heating apparatus 20 as shown in Fig. 4, or a gas burning apparatus 21, as shown in Fig. 5. In either instance, the air liberated by the lower ends of the conduit branches 17 impinges against the heating apparatus and is heated thereby, the heated air rising in the oven and eventually entering the flue 5 from where the fan 12 causes the air to be returned to the conduit 13 and distributed at the bottom of the oven.

Figure 2:
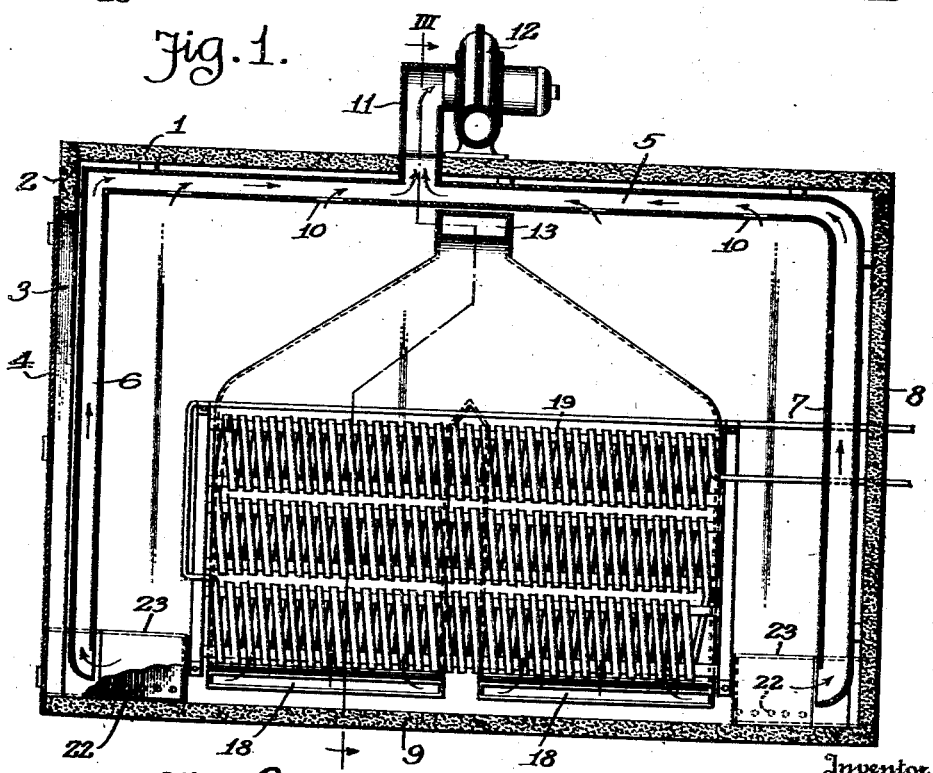
Fig. 2 is a longitudinal sectional view taken on the line II—II of Fig. 1.

By reference to Fig. 2, it will be noted that the conduit branches 17 are comparatively wide and provide a long outlet for air at each side of the oven, thus insuring a wide distribution of air within the oven and consequently a wide range of circulation.

In order that the temperature within the oven may be reduced by the admission of cold fresh air thereto, the walls 2 and 8 of the oven are provided with side apertured air inlet casings 22, said casings resting on the bottom or floor 9 of the oven contiguous to the side walls thereof. The casings 22 have register fronts 23 by which the admission of cold air to the oven is controlled, and the location of the casings does not interfere with the depending ends of the flue 5, the branches 17 of the conduit 13, or the heating apparatus within the oven.

It is through the medium of the air inlet casings 22 and the two-way connection 15 that a circulation of air may be maintained in the oven for exhausting gases and fumes therefrom, and this is necessary when obnoxious gases or fumes are liberated by articles being dried within the oven, so that workmen may safely enter the oven or the oven be opened.

What I claim is:—

1. In an oven, substantially inverted U-shaped flues disposed at an angle to each other and having the lower ends thereof open at the bottom of the oven, said flues communicating with each other above said oven so that air may circulate through said flues.

2. Oven flues as called for in claim 1, wherein one of said flues has flared ends affording large discharge openings into the oven.

3. In an oven having a heating apparatus, a longitudinal flue adapted to remove air from the bottom of the oven at the ends thereof, an exhaust fan communicating with said flue, and a transversely disposed conduit adapted to receive the air from said fan and distribute the air at the heating apparatus in the oven.

4. An oven as in claim 3, wherein the flue has openings to receive air from the top of the oven.

5. An oven as in claim 3, characterized by the fan having a two-way connection by which air may be exhausted to the atmosphere.

6. An oven having a heating apparatus, a flue adapted to remove air from the bottom of the oven at the ends thereof and from along the top of the oven, an exhaust fan communicating with said flue, a conduit adapted to communicate with said fan and discharge air at the bottom of said oven adjacent said heating apparatus, and means adapted to admit air to the oven.

7. An oven having a heating apparatus, a flue adapted to remove air from the bottom of the oven at the ends thereof and from along the top of the oven, an exhaust fan communicating with said flue, a conduit adapted to communicate with said fan and discharge air at the bottom of said oven adjacent said heating apparatus, a two-way connection interposed between said fan and conduit and adapted to communicate with the atmosphere, and a damper in said two-way connection.

8. An oven having a heating apparatus, a flue adapted to remove air from the bottom of the oven at the ends thereof and from along the top of the oven, an exhaust fan communicating with said flue, a conduit adapted to communicate with said fan and discharge air at the bottom of said oven adjacent said heating apparatus, and side air inlet casings at the bottom of said oven.

In testimony whereof I affix my signature in presence of two witnesses.

GEORGE A. YOUNG.

Witnesses:
ANNA M. DORR,
KARL H. BUTLER.